(12) United States Patent
Li et al.

(10) Patent No.: US 11,605,476 B2
(45) Date of Patent: Mar. 14, 2023

(54) METHOD AND DEVICE FOR ENHANCING VACUUM TOLERANCE OF OPTICAL LEVITATION PARTICLES BY PREHEATING DESORPTION

(71) Applicants: Zhejiang Lab, Zhejiang (CN); Zhejiang University, Zhejiang (CN)

(72) Inventors: Cuihong Li, Zhejiang (CN); Yuanyuan Ma, Zhejiang (CN); Yizhou Zhang, Zhejiang (CN); Xiaowen Gao, Zhejiang (CN); Shaochong Zhu, Zhejiang (CN); Huizhu Hu, Zhejiang (CN)

(73) Assignees: Zhejiang Lab, Zhejiang (CN); Zhejiang University, Zhejiang (CN)

( * ) Notice: Subject to any disclaimer, the term of this patent is extended or adjusted under 35 U.S.C. 154(b) by 0 days.

(21) Appl. No.: 17/902,215

(22) Filed: Sep. 2, 2022

(65) Prior Publication Data
US 2022/0415534 A1    Dec. 29, 2022

(51) Int. Cl.
*G01N 15/14* (2006.01)
*G21K 1/00* (2006.01)
*H05B 3/00* (2006.01)
*G01N 15/08* (2006.01)

(52) U.S. Cl.
CPC ......... *G21K 1/006* (2013.01); *G01N 15/1434* (2013.01); *H05B 3/0038* (2013.01); *G01N 15/0893* (2013.01)

(58) Field of Classification Search
CPC . G21K 1/006; G01N 15/1434; G01N 15/0893
See application file for complete search history.

(56) References Cited

U.S. PATENT DOCUMENTS

2020/0209141 A1*  7/2020  Trichet ............... G01N 15/1484
2020/0254930 A1*  8/2020  Schmalenberg ..... H04N 13/327

OTHER PUBLICATIONS

Vacuum Optical Tweezers Technology and Application, Tian Yuan, "Physical Experiments", vol. 41, No. 1, pp. 1-8, Jan. 31, 2021.

* cited by examiner

*Primary Examiner* — Eliza W Osenbaugh-Stewart

(57) ABSTRACT

A method for enhancing vacuum tolerance of optical levitation particles includes steps of: (1) turning on a trapping laser to form an optical trap, loading the particles to an effective capture region of the optical trap, and collecting scattered light signals; (2) turning on the preheating laser, and directing a preheating laser beam to the captured particles; (3) adjusting a power of the preheating laser until a particle heating rate is larger than a heat dissipation rate; (4) turning on the vacuum pump, and stopping evacuating when a vacuum degree is greater than a vacuum inflection point of a first reduction of the effective capture region of the optical trap; and (5) turning off the preheating laser when the scattered light signals collected by the photodetector no longer changes. The present invention improves a stable capture probability of the particles in high vacuum environment.

3 Claims, 4 Drawing Sheets

METHOD AND DEVICE FOR ENHANCING VACUUM TOLERANCE OF OPTICAL LEVITATION PARTICLES BY PREHEATING DESORPTION

CROSS REFERENCE OF RELATED APPLICATION

The present invention claims priority under 35 U.S.C. 119(a-d) to CN 202111094692.7, filed Sep. 17, 2021.

BACKGROUND OF THE PRESENT INVENTION

Field of Invention

The present invention relates to a technical field of sensor calibration, and more particularly to a method and a device for enhancing vacuum tolerance of optical levitation particles by preheating desorption.

Description of Related Arts

Since the optical tweezers technology was developed by Arthur Ashkin in the 1970s, it has been widely studied and applied in the fields of molecular biology, nanotechnology, and experimental physics as a general tool for capturing and manipulating particles. In the optical tweezers technology, the particles levitated by the laser beam can be understood as a simple harmonic oscillator model. Compared with the traditional oscillator model, the optical tweezers technology has no contact mechanical dissipation. Furthermore, unlike the optical tweezers system in liquid or air medium, the optical tweezers system operated in vacuum can completely isolate the levitated unit from the environment. Based on this advantage, scientists of applied physics have carried out a lot of research on vacuum optical tweezers technology in fundamental physics such as thermodynamics, quantum physics and sensing.

The physical property research of micro- and nano-sized particles is of great application significance to the optical tweezers technology based on vacuum optical levitation principle. The basic principle of optical levitation is to levitate tiny particles by combining tightly focused optical field gradient force and scattering force. The silica particle widely used in the vacuum optical tweezers technology is not specially designed and synthesized for the vacuum optical levitation system, but is synthesized through the Stöber method proposed by Stöber et al. in 1968, that is, hydrolyzing tetraethyl orthosilicate in ethanol solution with ammonia as catalyst. The silica particles obtained by the Stöber method are usually amorphous silica with a porous structure, as shown in FIG. 1. There are microporous structures on the surface (open micropores) or inside (closed micropores) of the particles, so the surface and interior are easy to adsorb impurities. During the vacuum optical tweezers experiment, with the increase of the vacuum degree, the air pressure gradually decreases, and the heat dissipation channel of the particles decreases, resulting in an increase in temperature, which in turn causes the desorption of impurities on the surface and interior of the particles. Through theoretical calculation of the variation process of the effective capture region of the optical trap with the vacuum degree, see FIG. 2, it can be found that when the vacuum degree of the levitated particles in the optical trap drops to 10 mbar-0.1 mbar, the effective capture range of the optical trap decreases sharply, so the levitated particles can easily get lost from the optical trap, resulting in the failure of vacuum levitation. The reduction of the sharply reduced air pressure is basically consistent with the vacuum loss of the microspheres observed in the experiment.

SUMMARY OF THE PRESENT INVENTION

To overcome defects of the prior art, an object of the present invention is to provide a method and a device for enhancing vacuum tolerance of optical levitation particles by preheating desorption. Accordingly, the present invention provides:

a method for enhancing vacuum tolerance of optical levitation particles by preheating desorption, comprising steps of:

(1) turning on a trapping laser to form an optical trap, loading the particles to an effective capture region of the optical trap, and collecting scattered light signals of captured particles through the photodetector;

(2) turning on the preheating laser, and directing a preheating laser beam to the captured particles;

(3) adjusting a power of the preheating laser until a particle heating rate is larger than a heat dissipation rate, thereby increasing an internal temperature of the particles for preheating;

(4) turning on the vacuum pump, and stopping evacuating when a vacuum degree is greater than a vacuum inflection point of a first reduction of the effective capture region of the optical trap; and (5) turning off the preheating laser when the scattered light signals collected by the photodetector no longer changes.

In the method, a wavelength of the preheating laser is selected in a wavelength range with a high particle absorption rate.

In the method, for silica particles, a laser with a wavelength within the far-infrared band is used to preheat the particles.

In the step (4) of the method, when evacuating is stopped, an air pressure is higher than the vacuum degree corresponding to a reduction of the effective capture region of the optical trap.

The present invention also provides a device for enhancing vacuum tolerance of optical levitation particles by preheating desorption, comprising a first laser, a preheating laser, a first optical modulator, a second optical modulator, a first lens, particles, a second lens, a vacuum cavity, a vacuum pump, a photodetector, and a control display system; wherein the first optical modulator, the first lens, and the second lens are sequentially arranged on an emergent light path of the first laser, and the first lens and the second lens are both located in the vacuum cavity; the photodetector is arranged on a refracted light path of the second lens; the second optical modulator is arranged on an emergent light path of the preheating laser; the vacuum cavity is connected to the vacuum pump; the first optical modulator, the second optical modulator, the photodetector and the vacuum pump are all connected to the control display system.

The device further comprises a laser automatic control device; the control display system controls signal outputs of the first and second optical modulators, so as to adjust switching and intensity of the first laser and the preheating laser.

In the device, the control display system controls the vacuum pump to regulate the vacuum degree in the vacuum cavity.

A method for operating the device comprises steps of:

turning on the first laser to emit a trapping laser, processing the trapping laser by the first optical modulator and emitting into the vacuum cavity, and then focusing by the first lens with a large numerical aperture to form the optical trap; loading the particles to the effective capture region of the optical trap for capturing the particles; turning on the preheating laser for particle preheating, then processing the preheating laser beam by the second optical modulator and emitting into the vacuum cavity; before heating, adjusting the light beam which passes through the preheating laser and the second optical modulator, so that it is aimed at the captured particles; turning on the vacuum pump to evacuate the vacuum cavity; adjusting an output power of the preheating laser, so that the particle heating rate of the laser is greater than the heat dissipation rate, thereby increasing the temperature of the particles; stopping evacuating when the vacuum degree in the vacuum cavity is slightly larger than the vacuum inflection point of the first reduction of the effective trapping area of the optical trap; keeping heating the microspheres until residual adsorption is released, then turning off the preheating laser; wherein the second lens is used to collect scattered light changes of the particles, and the collected signals enter the photodetector to facilitate desorption status monitoring of the particles; the control display system is used for system signal acquisition and control.

Beneficial effect of the present invention:

(1) The present invention improves a stable capture probability of the particles in high vacuum environment, and reduces the restriction of microsphere preparation technology on optical tweezers technology in vacuum, thereby promoting the application of the optical tweezers technology in vacuum, which is conducive to the stable construction of ultra-sensitive detectors such as extremely weak force detector for zepto-level, nanoparticle mass detector for sub-femtogram-level, and accelerometer for microgal-level.

(2) Stable capture of the particles in a high vacuum environment is conducive to the research of macroscopic quantum phenomena, microscopic thermodynamics, ultra-high-speed rotors, and short-range mechanical phenomena.

DETAILED DESCRIPTION OF THE PREFERRED EMBODIMENT

Referring to accompanying drawings and embodiments, the present invention will be further described, and the purpose and effects of the present invention will become clearer. It should be understood that the embodiments to be described are exemplary only and not intended to be limiting.

First, method and design principles of the present invention will be described.

Figure 1:
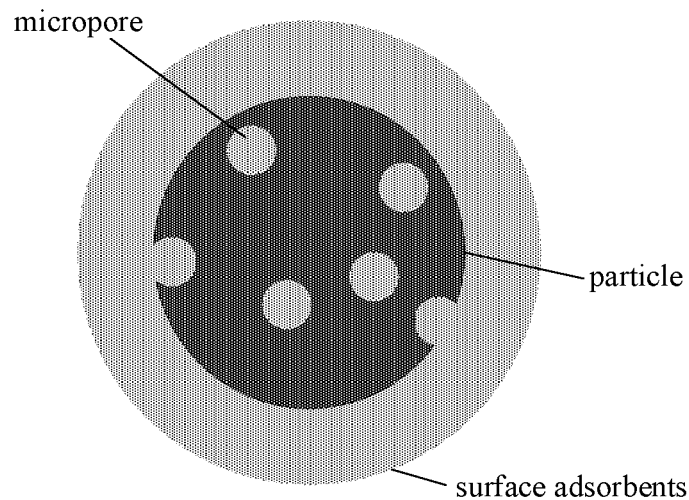
FIG. 1 is a structural view of a microsphere.
Figure 2:
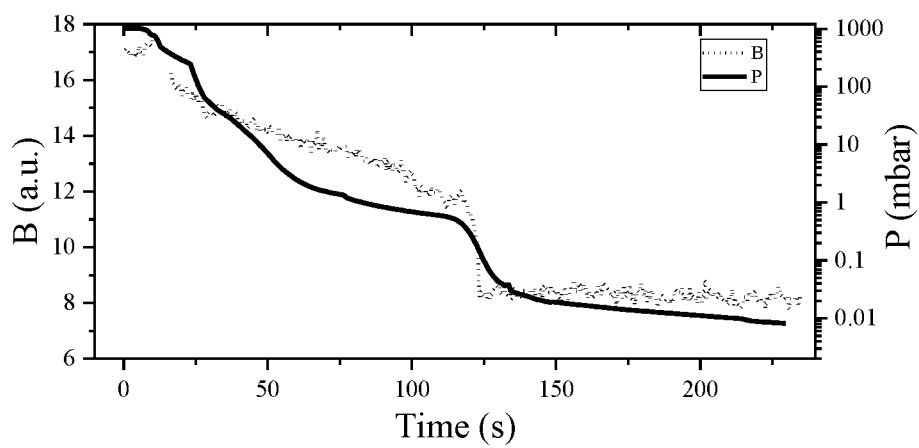
FIG. 2 is three-axis variation curves of an effective capture region of an optical trap based on vacuum degree, wherein the optical trap is formed by focusing a continuous light with an objective lens with a numerical aperture of 0.8; a laser power of the continuous light is 100 mW and a wavelength is 1064 nm.

In a high-sensitivity extremely weak force and acceleration sensing device built based on optical trap technology and mechanically sensitive characteristics of optical levitation particles, there is no ideal levitation medium that does not absorb light. An important reason for the loss of particles is that microspheres can absorb heat to increase its motion, and then escape the optical trap. Referring to FIG. 2, when there is no external heating, scattered light intensity of the particles gradually decreases with decrease of vacuum degree. Around 1mbar, the scattered light intensity of the microspheres drops sharply, corresponding to a large impurity desorption process, and then the scattered light intensity of the particles is essentially constant. The scattered light intensity of the particles is proportional to the square of the particle radius, so the weakening of the scattered light intensity corresponds to the impurity release process when the volume of the microspheres becomes smaller. Therefore, with a trapping light which forms an optical trap, the particles will also absorb heat. When the temperature rises to a certain extent, desorption of impurities on the surface and interior of the particles occurs, and motion is intensified, increasing a probability for the particles to escape from the optical trap.

Figure 3:
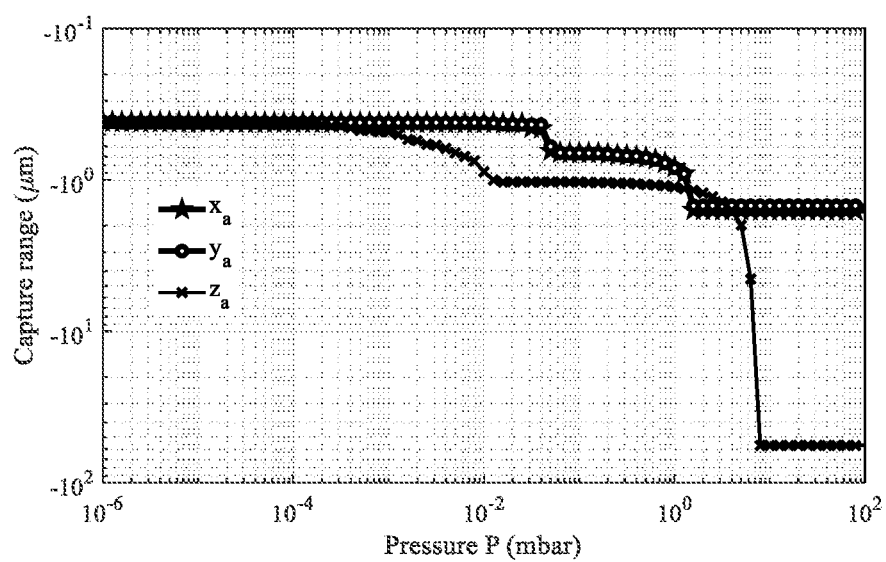
FIG. 3 is variation curves of scattered light signals based on the vacuum degree during particle interior and surface impurity release process without preheating.

In addition, under low vacuum degree conditions, there are many air molecules to facilitate the dissipation of heat. Since air damping is large, the effective capture region is large and the particles are not easy to escape. As the vacuum degree increases, the density of air molecules decreases, so the heat dissipation slows down and the air damping decreases, which decreases the effective capture region of the optical trap, letting the particles easily escape from the optical trap and get lost. Referring to FIG. 3, the scattered light of particles first weakens and then remains, which is consistent with a variation trend of the vacuum degree. From atmospheric pressure to 1 mbar, the scattered light intensity of the microspheres decreases continuously. Around 1 mbar, the scattered light intensity of the microspheres drops sharply, which corresponds to a large impurity desorption process, and then the scattered light of the microspheres is basically constant despite the air pressure decreases. The scattered light intensity of the particles is proportional to the square of the particle radius, so the weakening of the scattered light intensity corresponds to the impurity release process when the volume of the microspheres becomes smaller.

Therefore, under the larger air pressure in the effective capture region of the optical trap, the temperature of the particles captured by the optical trap is increased by active laser preheating technology, so as to promote the desorption of impurities on surface and interior of the particles. When the scattered light signal of the microspheres collected by the photodetector no longer changes, it means that the impurity desorption is complete, and the preheating laser is turned off. The impulse is released in advance to ensure no escaping under high vacuum degree, which improves a stable capture probability of the particles in high vacuum environment, and is beneficial to the application research of vacuum optical tweezers technology in weak force detection and acceleration measurement.

Embodiment of Application

Single levitation silica particle in an optical trap under a high vacuum degree condition is provided.

Figure 4:
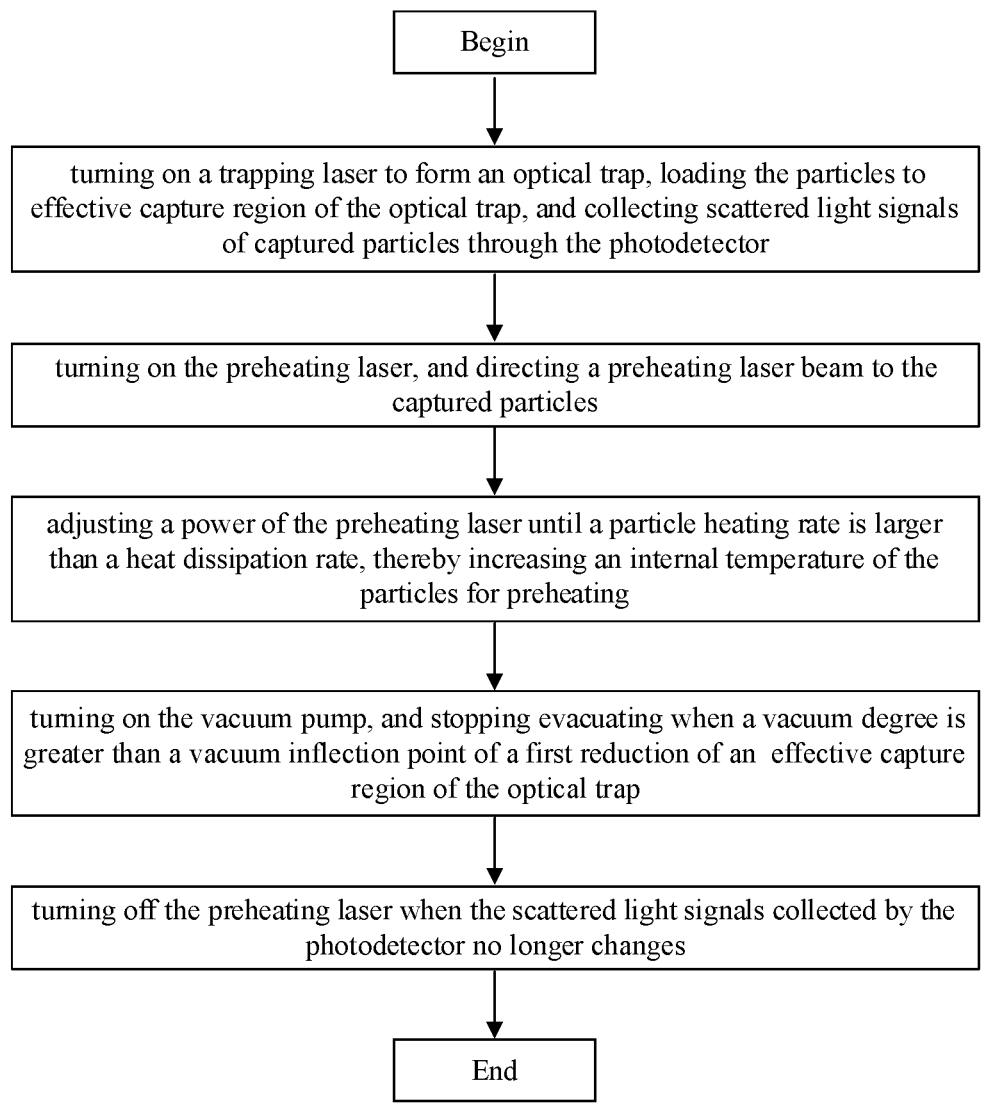
FIG. 4 is a flow chart of a method for enhancing vacuum tolerance of optical levitation particles by preheating desorption.

Preheating of levitation silica microsphere is illustrated, as shown in FIG. 4, comprising steps of:

(1) under atmospheric pressure, highly diluting silica microsphere of 200 nanometers in diameter prepared by a sol-gel method into an isopropanol solvent, and then delivering the particles into an optical trap by an atomization spray method, so as to capture the particles by the optical trap and realize microsphere levitation;

(2) turning on a preheating laser with a wavelength of 9 microns, and directing a preheating laser beam to the captured particles;

(3) turning on a vacuum pump and slowly evacuating;

(4) adjust an output power of the preheating laser so that a power density is greater than 104 $W/mm^2$, and a particle heating rate is larger than a heat dissipation rate, thereby heating the particles and desorbing impurities on surfaces and interiors of the particles;

(5) stopping evacuating when a vacuum degree in the vacuum cavity reaches 30 mbar; keeping heating the microspheres, and collecting scattered light signals of the microspheres through a photodetector;

(6) referring to FIG. 2, when a scattered light intensity is attenuated to no longer change or a resonance frequency is reduced by 5% according to the signals collected by the photodetector, it indicates that residual adsorption is released; and (7) turn off the preheating laser.

Now high vacuum experiments can be carried on.

Embodiment of Device

Figure 5:
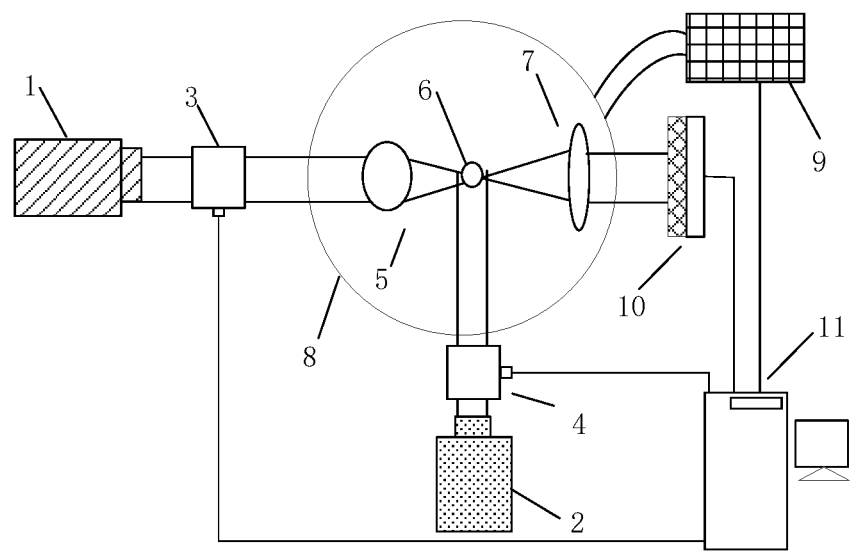
FIG. 5 is a sketch view of a device for enhancing the vacuum tolerance of the optical levitation particles by the preheating desorption.

Referring to FIG. 5, the present invention provides a device for enhancing vacuum tolerance of optical levitation particles by preheating desorption, comprising a first laser 1, a preheating laser 2, a first optical modulator 3, a second optical modulator 4, a first lens 5, particles 6, a second lens 7, a vacuum cavity 8, a vacuum pump 9, a photodetector 10, and a control display system 11.

The first optical modulator 3, the first lens 5, and the second lens 7 are sequentially arranged on an emergent light path of the first laser 1, and the first lens 5 and the second lens 7 are both located in the vacuum cavity 8; the photodetector 10 is arranged on a refracted light path of the second lens 7; the second optical modulator 4 is arranged on an emergent light path of the preheating laser 2; the vacuum cavity 8 is connected to the vacuum pump 9; the first optical modulator 3, the second optical modulator 4, the photodetector 10 and the vacuum pump 9 are all connected to the control display system 11. The control display system 11 controls signal outputs of the first optical modulator 3 and second optical modulator 4, so as to adjust switching and intensity of the first laser 1 and the preheating laser 2. The control display system 11 controls the vacuum pump 9 to regulate the vacuum degree in the vacuum cavity 8. The second lens 7 is used to collect scattered light changes of the particles, and the collected signals enter the photodetector 10 to facilitate desorption status monitoring of the particles.

A method for operating the device comprises steps of: turning on the first laser 1 to emit a trapping laser, processing the trapping laser by the first optical modulator 3 and emitting into the vacuum cavity 8, and then focusing by the first lens 5 with a large numerical aperture to form the optical trap; loading the particles to effective capture region of the optical trap; turning on the preheating laser 2 for particle preheating, then processing the preheating laser beam by the second optical modulator 4 and emitting into the vacuum cavity 8; before heating, adjusting the light beam which passes through the preheating laser 2 and the second optical modulator 4, so that it is aimed at the captured particles 6; turning on the vacuum pump 9 to evacuate the vacuum cavity 9; adjusting an output power of the preheating laser 2, so that the particle heating rate of the laser is greater than the heat dissipation rate, thereby increasing the temperature of the particles; stopping evacuating when the vacuum degree in the vacuum cavity 8 is slightly larger than the vacuum inflection point of the first reduction of the effective capture region of the optical trap; keeping heating the microspheres until residual adsorption is released, then turning off the preheating laser 2.

The above descriptions are only preferred embodiments of the present invention and are not intended to be limiting. The descriptions are specific and detailed, but should not be construed as restrictions of the present invention. It should be pointed out that for those skilled in the art, modifications and improvements can be made without departing from the concept of the present invention, which all fall into the protection scope of the present invention.

What is claimed is:

1. A method for enhancing vacuum tolerance of optical levitation particles by preheating desorption, comprising adopting a device for performing the method, wherein the device comprises a first laser, a preheating laser, a first optical modulator, a second optical modulator, a first lens, particles, a second lens, a vacuum cavity, a vacuum pump, a photodetector, and a control display system; wherein the first optical modulator, the first lens, and the second lens are sequentially arranged on an emergent light path of the first laser, and the first lens and the second lens are both located in the vacuum cavity; the photodetector is arranged on a refracted light path of the second lens; the second optical modulator is arranged on an emergent light path of the preheating laser; the vacuum cavity is connected to the vacuum pump; the first optical modulator, the second optical modulator, the photodetector and the vacuum pump are all connected to the control display system;

the method comprises specific steps of:
(1) turning on a trapping laser to form an optical trap, loading the particles to an effective capture region of the optical trap, and collecting scattered light signals of captured particles through the photodetector;
(2) turning on the preheating laser, and directing a preheating laser beam to the captured particles;
(3) adjusting a power of the preheating laser until a particle heating rate is larger than a heat dissipation rate, thereby increasing an internal temperature of the particles for preheating;
(4) turning on the vacuum pump, and stopping evacuating when a vacuum degree is greater than a vacuum inflection point of a first reduction of the effective capture region of the optical trap; and
(5) turning off the preheating laser when the scattered light signals collected by the photodetector no longer changes.

2. The method, as recited in claim 1, wherein the particles are silica, and a laser with a wavelength within a far-infrared band is used to preheat the particles.

3. The method, as recited in claim 1, wherein in the step (4), when evacuating is stopped, an air pressure is higher than the vacuum degree corresponding to a reduction of the effective capture region of the optical trap.

* * * * *